May 6, 1958 — W. GREGORY — 2,833,072
IDENTIFICATION PICTURE ASSEMBLY FOR A VEHICLE
IDENTIFICATION SYSTEM
Filed May 3, 1957
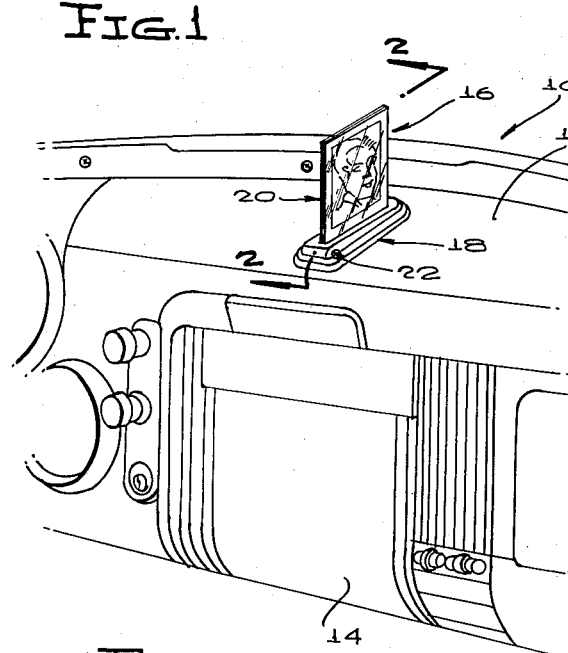
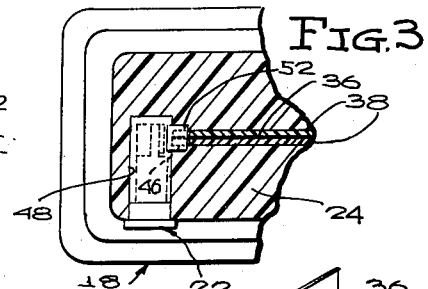
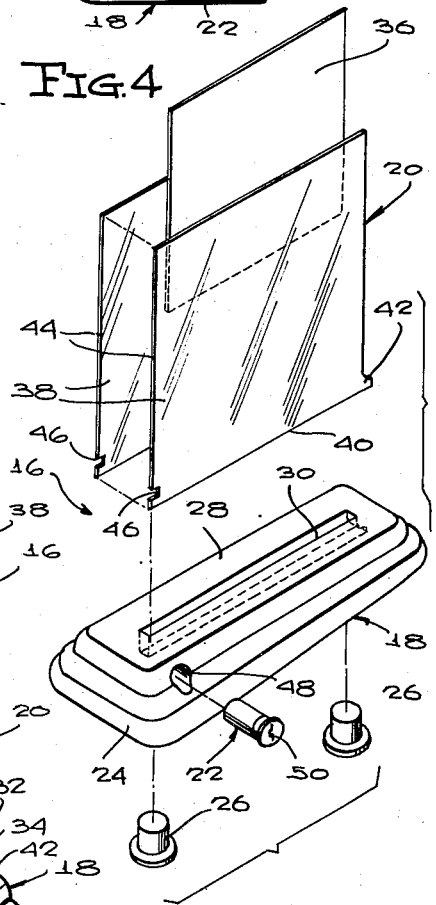
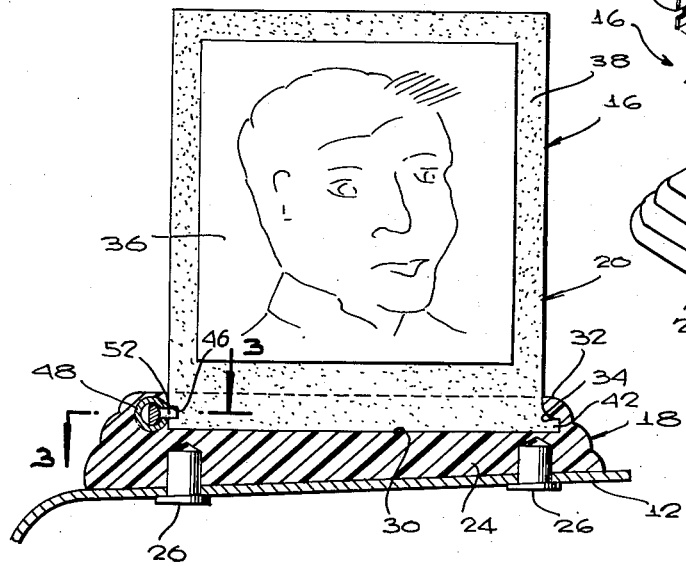
INVENTOR.
WILLIAM GREGORY
BY
McMorrow, Berman + Davidson
ATTORNEYS

United States Patent Office 2,833,072
Patented May 6, 1958

2,833,072
IDENTIFICATION PICTURE ASSEMBLY FOR A VEHICLE IDENTIFICATION SYSTEM

William Gregory, Norwalk, Ohio

Application May 3, 1957, Serial No. 656,948

1 Claim. (Cl. 40—152.1)

This invention relates generally to systems for protecting vehicles from theft and unauthorized use, and is more particularly concerned with an identification picture assembly for a vehicle identification system for identifying the owner or authorized drivers of said vehicle.

A primary object of invention is to provide an identification assembly for securement on a permanent portion of a vehicle, such as the horizontal support surface of a passenger vehicle dashboard.

Another object of invention in conformance with that set forth is to provide a novel identification picture assembly of the character involved which is readily and economically manufactured, easily installed, and highly satisfactory, practical and acceptable for the purpose intended.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1 is a fragmentary perspective view of the interior of a vehicle, of the passenger type, showing the novel identification picture assembly secured on the horizontal support surface of the dashboard of such vehicle;

Figure 2 is an enlarged fragmentary sectional view taken substantially on line 2—2 of Figure 1;

Figure 3 is a fragmentary sectional view taken substantially on line 3—3 of Figure 2; and Figure 4 is an exploded perspective view of the novel identification picture assembly of the invention.

Referring to the drawing in detail, a fragmentary portion of an automotive vehicle is indicated generally at 10, said vehicle incorporating a horizontal permanent support surface 12 constituting a portion of the dashboard 14 of the vehicle. Although the preferred embodiment of invention is indicated relative to a passenger vehicle, it is to be understood that the novel identification picture assembly may be secured on any permanent portion of a vehicle to present the identification photograph assembly indicated generally at 16 in a clearly visible position in such vehicle.

The identification photograph assembly 16 comprises a base member 18, a picture 20, and a lock assembly 22.

The base member 18 may be constructed of a suitable material, molded plastic, for example, and includes a body portion 24 suitably conformed to be juxtaposed on the upper surface of the horizontal support surface 12, said body portion 24 being secured to said horizontal support surface 12 by means of suitable securing rivets 26, for example, extending through aligned apertures in said horizontal support surface 12 and the body member 24. Opening in the upper surface 28 of the body member 24 is an elongated longitudinally extending slot portion 30 which has overlying one end a flange portion 32 integral with the body member 24 and defining in communication with the slot portion 30 a recess portion 34, see Figure 2.

The picture 20 comprises a photograph 36 identifying the owner of the vehicle or an authorized driver of the same, said photograph being permanently mounted between two rigid cover plates of a suitable transparent plastic 38 similarly conformed and being molded as a single member by means of a suitable adhesive material such as an acetone which is effective to mold said two plastic plates together. The two plastic plates 38 incorporate at the lower edge 40 thereof and integral lateral tongue portion 42 suitably conformed to be received within the notch portion 34 of the base member. Extending into the edge 44 of the plastic plates 38 in substantial alignment with the tongue 42 thereof are notch portions 46 which will be disposed within the slot portion 30 of the base member as clearly seen in Figure 2.

Extending transversely through one side of the base member 24 in substantially intersecting relationship with the end of the slot portion 30 thereof and adjacent the portion of the cover plates 38 which include the notch portions 46 is a bore portion 48 which removably receives therein the lock assembly 22.

The lock assembly 22 may be of any conventional character incorporating in one end a key-slot portion 50 which will receive therein a suitable actuating key (not shown) for laterally extending a key-actuated latch element 52 into the notch portions 46 of the cover plate 38 and accordingly retaining the same in a fixed position in the support base of the identification picture assembly.

The key for actuating the lock assembly 22 will be retained in the position of a duly authorized official, such as the State Police, licensing bureau or the like and accordingly when a vehicle is purchased the owner's photograph will be disposed in the identification photograph assembly for subsequently identifying such an individual as the proper owner of the vehicle. Obviously, numerous identification picture assemblies may be incorporated on a single vehicle for identifying those authorized drivers of the vehicle. Furthermore, when the vehicle is subsequently sold, the picture 20 may be removed and the new owner's picture may be substituted therefor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claim.

What is claimed as new is as follows:

In a vehicle identification system, the combination of a picture assembly for fixed securement on a permanent portion of a vehicle such as the horizontal surface of a vehicle dashboard, a base member including means for fixedly securing the same to the vehicle; a picture including a photograph positioned between two rigid cover plates having the lower portions of the plates removably received in the base member; and a lock assembly extending between the base member and cover plates fixedly securing the picture on the base member identifying the authorized driver of the vehicle, said base member including an elongated slot portion opening into an outer surface portion thereof, said base member further including a flange overlying one end of the slot portion defining a notch at one end of said slot portion, the cover plates having lower edge portions removably received in the slot portion and including an integral lateral tongue portion lockingly received in said notch in the base member, the cover plates including a notch portion in an edge opposite the tongue portion and opening toward the opposite end of the slot portion of the base member, the base member including a transverse bore portion intersecting the slot portion thereof adjacent the notch portion of the cover plates disposed in said slot portions, the lock assembly comprising an elongated tubular body portion removably received in the transverse bore portion of the base member and including a key-actuated latch extendible therefrom removably received in the notch portions of the cover plates for locking the same in the base member.

References Cited in the file of this patent

UNITED STATES PATENTS

| | | |
|---|---|---|
| 1,095,739 | Schramm | May 5, 1914 |
| 2,050,136 | Tucker et al. | Aug. 4, 1936 |
| 2,519,518 | Victor | Aug. 22, 1950 |
| 2,540,221 | Ten Hoeve et al. | Feb. 6, 1951 |
| 2,559,163 | Macdonald | July 3, 1951 |

FOREIGN PATENTS

| | | |
|---|---|---|
| 582,775 | Great Britain | Nov. 27, 1946 |
| 289,937 | Sweden | July 16, 1953 |